S. F. ESTELL & A. D. WESTBROOK.
HOSE COUPLING.
APPLICATION FILED SEPT. 25, 1909.

1,006,190. Patented Oct. 17, 1911.

Witnesses
Milton Lenoir
Daisy F. Hughes

Inventors
Samuel F. Estell,
Arthur D. Westbrook
By Gillson & Gillson
Attorneys.

UNITED STATES PATENT OFFICE.

SAMUEL F. ESTELL, OF FLORENCE, AND ARTHUR D. WESTBROOK, OF LOS ANGELES, CALIFORNIA.

HOSE-COUPLING.

1,006,190.      Specification of Letters Patent.      Patented Oct. 17, 1911.

Application filed September 25, 1909. Serial No. 519,634.

*To all whom it may concern:*

Be it known that we, SAMUEL F. ESTELL, a resident of Florence, county of Los Angeles, and State of California, and ARTHUR D. WESTBROOK, a resident of Los Angeles, county of Los Angeles, and State of California, citizens of the United States of America, have invented certain new and useful Improvements in Hose-Couplings, of which the following is a specification, and which are illustrated in the accompanying drawings, forming a part thereof.

The invention relates to connectors for pipe sections, and more especially to connectors for the sections of flexible hose such as is employed in various sizes for the distribution of water upon lawns and gardens, and for conducting water to extinguish fires. These connectors as heretofore commonly employed have comprised two members having complementary formed screw threaded entering and receiving nipples respectively, each of such members being adapted to be applied to the end of one of the hose sections to be connected and the connecting being effected by screwing the receiving or socketed nipple of one of the members upon the screw-threaded nipple of the other. Usually the screw threaded entering nipple of these members has resembled that commonly provided upon hydrants and pipes, and the member having the complementary formed receiving nipple may therefore be employed either in conjunction with the member having the entering nipple for connecting hose sections together or alone for connecting a hose section to a hydrant or pipe.

Our invention has for its object to provide a hose coupling by means of which connections may be made or broken without a laborious screwing together of the parts, and the invention contemplates an internally threaded socketed member of improved form capable of being applied to the end of a hose section and of receiving the externally threaded nipple commonly found upon hydrants and pipes and upon the entering member of hose couplings of the form heretofore employed.

Figure 1:
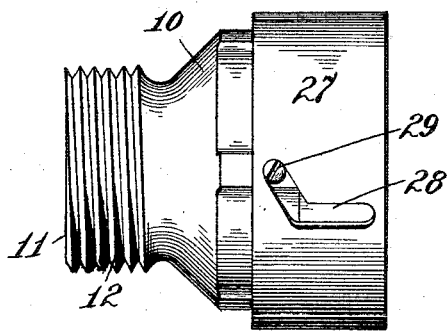
Figure 2:
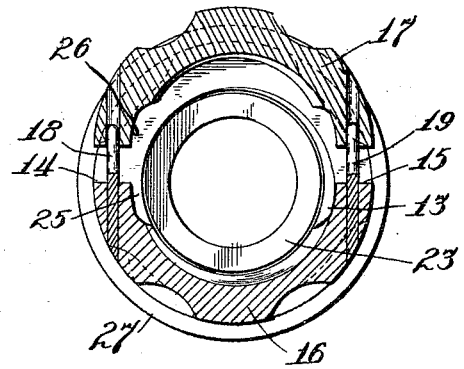
Figure 3:
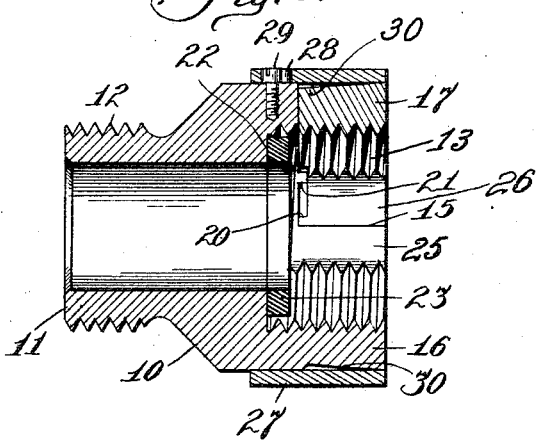
Figure 4:
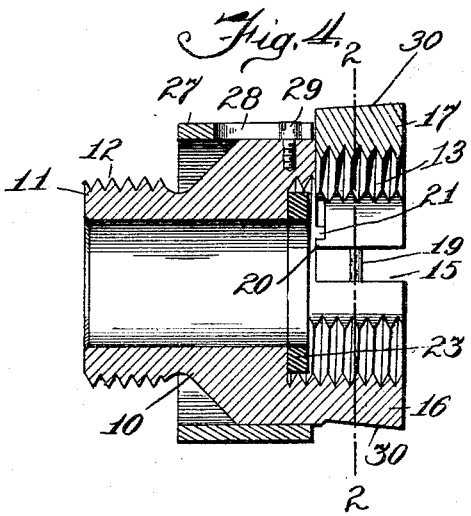

In the accompanying drawings, Figure 1 shows in side elevation the receiving or socketed member of a hose coupling, embodying our invention. Fig. 2 is a cross-sectional view of the same taken on the line 2—2 of Fig. 4. Fig. 3 is a central longitudinal sectional view of the same, and Fig. 4 is similar to Fig. 3, but shows the parts in a different position.

In carrying out the invention we provide a tubular member 10 having a stem 11 adapted to be secured to the end of a section of hose or pipe as by being provided with an external screw thread 12, capable of entering the socketed member of an ordinary screw-threaded hose coupling (not shown). The other end of the member 10 is provided with an internally threaded socket 13. At the base of the socket 13 there is the usual annular shoulder 22 which constitutes a seat for a rubber gasket 23. The walls of the socket 13 are made expansible in order that they may be applied to an externally-threaded nipple (not shown) without screwing the parts together. Preferably the wall of the socket 12 is longitudinally divided, as at 14, 15. As shown, the part 16 of the wall of the socket 13 at one side of the division 14, 15, is formed integral with the body of the member 10, and the remaining portion 17 is laterally movable, as by having a sliding fit upon dowel pins 18, 19, carried by the part 16. For limiting the lateral movement of the part 17, coöperating stop lugs 20, 21, are conveniently employed, these stop lugs, as shown, being formed upon the member 17 and upon the end wall of the body of the member 10 respectively. In order that the walls of the socket 13 may be passed over a screw-threaded nipple when the parts 16, 17, are separated, as in Figs. 2 and 4 of the drawing, the screw-thread within the socket is omitted adjacent the meeting edges of the member 16, 17, as shown at 25, 26, Fig. 2.

Means are provided for compressing the parts 16, 17, of the walls of the socket 13 together upon a screw-threaded nipple, and for locking them in the closed position. For this purpose a ring or collar 27 is preferably provided. As shown, the ring 27 is slidably mounted on the member 10 and is connected thereto by a form of bayonet joint comprising a cam slot 28 formed in the ring 27, and a pin 29 set into the body of the member 10 through the cam slot. The ring 27 is adapted to be moved forwardly over the parts 16, 17, of the walls of the socket 13 when these parts are in the closed or partially closed position, and to lock the parts in the closed position when the ring is completely advanced over them. As shown at 30 (Fig. 3) the parts 16, 17, have flaring side walls, and when the ring 27 is advanced upon these members it engages the flaring side walls 30 to compress the parts together by a wedging action. Preferably the cam slot 28 is made straight for a portion of its length in order that the ring 27 may be pushed forwardly in a straight line to partially overlap the members 16, 17. The rear portion of the cam slot 28 is inclined to serve as a cam for effecting a further advance of the ring when it is rotated. As shown, the rear portion of the cam slot 28 is inclined backwardly from that direction through which the parts should be turned to advance the thread of the socket 13 upon a threaded nipple. The walls of the slot 28 therefore engage the pin 29 by a cam action for advancing the ring 27 upon the inclined walls 30 of the parts 16, 17, if the ring, after being first partially advanced, be rotated to firmly seat the socket 13 upon a threaded nipple.

In use the socket 13 is applied to a threaded nipple by a direct thrust when the parts 16, 17, are separated, as in Fig. 2 of the drawing. If now the parts 16, 17, be closed together and the ring 27 moved forwardly upon them until the rear end of the straight portion of the cam slot 28 reaches the pin 29 and the ring 27 is then rotated, the pin 29 will cause a further advance of the ring by a cam engagement with the walls of the inclined portion of the slot 28, thus firmly compressing the parts 16, 17, of the walls of the socket 13 upon the threaded nipple to which the device is to be connected. When the ring 27 has been completely advanced in this way its further rotation will cause a rotation of the entire device, thus causing the screw-thread of the socket 13 to advance upon that of the nipple. Usually only a partial rotation of the device will be sufficient to cause the gasket 23 to be firmly compressed upon the end of the nipple to which connection is made, and a tight joint thereby secured. For disconnecting the parts a partial counter-rotation of the ring 27 will cause it to be partially withdrawn from the inclined walls of the members 16, 17, because of the cam engagement of the pin 29 with the walls of the socket 28. The members 16, 17, of the walls of the socket 13 may then be completely released by sliding the ring 27 backwardly, and when thus released, lateral pressure upon the device will cause the members 16, 17, to be separated to such an extent that the walls of the socket 13 may be removed from the threaded nipple by a direct pull.

The device described permits of a firm connection being very rapidly made between sections of a hose, or between a hose section and the threaded nipple of a hydrant or pipe. A separation of the connected sections may also be made quite as rapidly as the making of the connection, and either is effected with but little effort. The invention further provides that these connections may be made to the externally threaded nipples with which hose sections, hydrants, and pipes are now commonly equipped.

We claim as our invention:

1. In a hose coupling, in combination, an openable internally threaded ring having flaring walls, a collar engageable with the flaring walls of the ring to compress it, and a pin and cam slot connection between the collar and ring whereby the collar is advanced upon the flaring walls of the ring by turning the collar in that direction required for advancing the thread of the ring in the same direction that the collar is advanced upon the flaring walls of the ring, and the ring is caused to turn with the collar when the collar is completely advanced.

2. In a hose coupling in combination, a tubular nipple having an internally threaded socket at one of its ends, the wall of the socket being longitudinally divided and one portion thereof being laterally movable, a wedging collar slidably mounted on the nipple and movable over the walls of the socket to compress them, the said collar being provided with a cam slot having a straight longitudinally extended forward portion and an inclined rearward portion backwardly directed as to the direction of rotation of the nipple for advancing the thread of the socket, and a pin entering the nipple through the said cam slot.

SAMUEL F. ESTELL.
ARTHUR D. WESTBROOK.

Witnesses:
W. D. McCONNELL,
T. F. McDONALD.

Copies of this patent may be obtained for five cents each, by addressing the "Commissioner of Patents, Washington, D. C."